United States Patent
Iou et al.

(10) Patent No.: US 9,102,470 B2
(45) Date of Patent: Aug. 11, 2015

(54) HANGER FRAMES TRANSPORTATION DEVICE WITH GEARING

(71) Applicants: Hsin-Chi Iou, Taoyuan County (TW); Chien-Wei Chang, Taoyuan County (TW)

(72) Inventors: Hsin-Chi Iou, Taoyuan County (TW); Chien-Wei Chang, Taoyuan County (TW)

( * ) Notice: Subject to any disclaimer, the term of this patent is extended or adjusted under 35 U.S.C. 154(b) by 0 days.

(21) Appl. No.: 14/462,669

(22) Filed: Aug. 19, 2014

(65) Prior Publication Data

US 2015/0114801 A1 Apr. 30, 2015

(30) Foreign Application Priority Data

Oct. 31, 2013 (TW) .............................. 102220290 U

(51) Int. Cl.
| | |
|---|---|
| *B65G 17/20* | (2006.01) |
| *B65G 19/00* | (2006.01) |
| *B65G 17/48* | (2006.01) |
| *B65G 17/12* | (2006.01) |

(52) U.S. Cl.
CPC ...................................... *B65G 17/20* (2013.01)

(58) Field of Classification Search
None
See application file for complete search history.

(56) References Cited

U.S. PATENT DOCUMENTS 3,785,474 A * 1/1974 Nakamoto .................... 198/355
5,921,368 A * 7/1999 Zaguroli, Jr. .................. 193/2 D

* cited by examiner

*Primary Examiner* — Kavel Singh
(74) *Attorney, Agent, or Firm* — Rosenberg, Klein & Lee

(57) ABSTRACT

A hanger frames transportation device with gearing driven by a fixed block and a plurality of sticks from a gearing that can stably move, fix, and detach hanger frames, so as to form a continual transportation device. The hanger frames slide along a first transverse track in lines and can be transported to a parallel second transverse track by a longitudinal rail switch in order to lengthen the transportation route; furthermore, a plurality of paralleled first and second transverse tracks are connected by moving devices in order to extend the transportation distance, therefore enabling a wet manufacturing process at the micrometer level during the continual transportation.

10 Claims, 12 Drawing Sheets

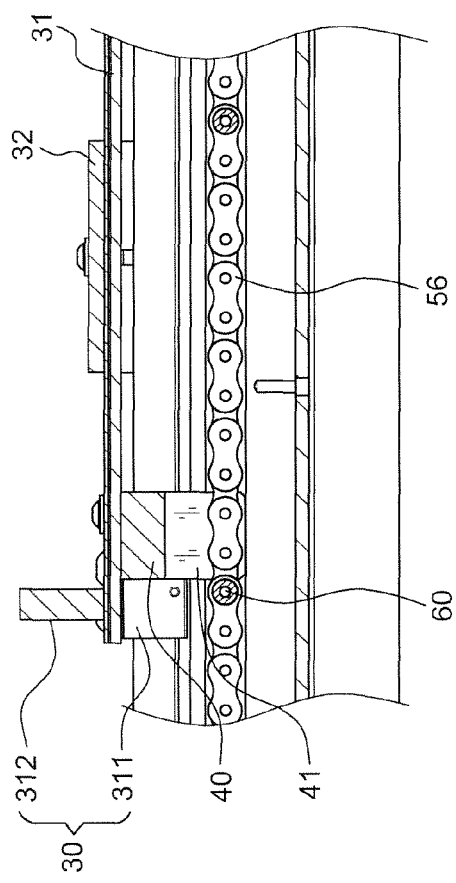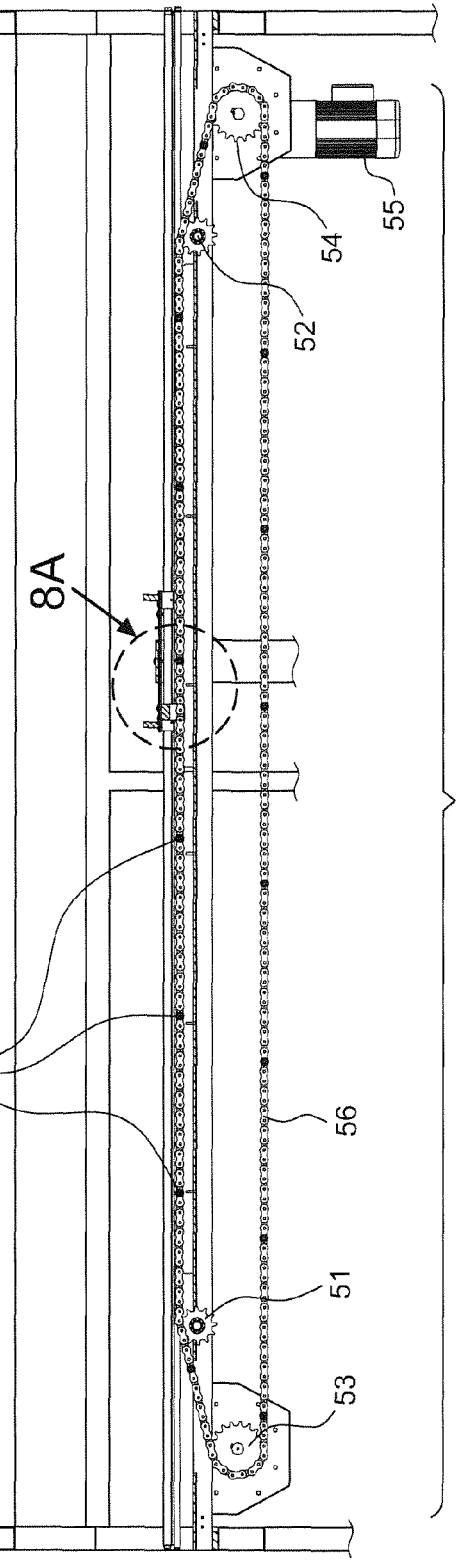

HANGER FRAMES TRANSPORTATION DEVICE WITH GEARING

BACKGROUND OF THE INVENTION

1. Field of the Invention

The present invention relates to a hanger frames transportation device, particularly to one that can move, fix, and detach hanger frames with gearing.

2. Description of the Related Art

A continual hanger frames transportation structure 1 for electroplating according to the prior art is shown in FIG. 1, comprising a plurality of parallel transverse bars 2, each including a rotatable upper roller 3 disposed below the bottom of a longitudinal pressing bar 5, and a plurality of rotatable lower rollers 4 disposed on a lower member. Thus, hanger frames can be moved along the track.

However, there are a number of drawbacks in the structure above. For example, the rollers 3, 4 tend to wear after being in use for a short period of time; or the hanger frames may abnormally displace in lateral direction, i.e. the direction of X-axis, and thus is not aligned with the longitudinal pressing bar 5, i.e. the direction of Y-axis. Therefore, the continual hanger frames transportation structure 1 according to the prior art is applicable to electroplating manufacturing at the millimeter level but cannot fulfill the needs for more precise and advanced manufacturing processes such as wet manufacturing process at the micrometer level.

Furthermore, the transportation of the hanger frames is to roll the chain 7 for the chain wheels 6 to rotate the upper rollers 3 and the lower rollers 4, therefore transporting the hanger frames. During the transportation, the weight of the hanger frames, transporting speed, driving force . . . , etc. are all the variables that can cause the instability of the chain 7 and the chain wheels 6, or it can cause the upper and lower rollers 3, 4 to displace, resulting the hanger frames to swing, and the dusts resulted from the swing is also a problem in the manufacturing process.

In conclusion, there is still room for improvements in the conventional structure of hanger frames transportation device.

SUMMARY OF THE INVENTION

A primary object of the present invention is to provide a hanger frames transportation device with gearing with which hanger frames are vertically hanging when being transported smoothly and continually during a wet manufacturing process. In addition, with the gearing, the device can stably move, fix, and detach hanger frames, so as to form a continual transportation device for the wet manufacturing process at the micrometer level.

Another object of the present invention is to provide a hanger frames transportation device with gearing with which hanger frames slide along a transverse track and can be transported to another parallel transverse track by a longitudinal rail switch in order to lengthen the transportation route: further, a plurality of paralleled transverse tracks are connected by moving devices in order to extend the transporting distance, therefore enabling the wet manufacturing process at the micrometer level during the continual transportation.

To achieve the objects mentioned above, the present invention comprises a frame body including a plurality of supporting elements; a first transverse track disposed at the front of said frame body, including at least two parallel rails; a hanger frame including a sliding plate that slides along said first transverse track, a hanger bracket engaging said sliding plate at top, and a hanging panel engaging the foot of said hanger bracket; a fixed block disposed at the bottom of said sliding plate and having a fillister at the bottom thereof; a gearing disposed on said frame body, underneath said first transverse track, including a first chain wheel and a second chain wheel symmetrically disposed on the left-hand and right-hand side of said frame body respectively, a third chain wheel disposed on the front lower left side of the first chain wheel, a fourth chain wheel disposed on the back lower right side of the second chain wheel, a motor for driving either the third or the fourth chain wheel, and a chain rolling on the first, second, third and fourth chain wheels with a plurality of sticks arranged on both sides so that when the chain runs through the area between the first and second chain wheel, it passes through the fillister of said fixed block and the sticks on both sides would push the fixed block to move the sliding plate along the first transverse track; and when the chain is rolling between the second and fourth chain wheels, it moves downwards, resulting the sticks leaving the fixed block, so as to form a continual transportation device to move the hanger frame on the first transverse track.

With structures disclosed above, the sliding plate is rectangular and the bottom thereof has at least four sliding seats in order to slide on the rails. The rails are in arc shape and the sliding seats are designed in accordance with the arc-shaped rails; and there is a layer of poly composites on the contact surface of the sliding seats.

Furthermore, the sliding plate of the hanger frame has at least one pushing block thereon; the sticks on both sides of the chain are arranged symmetrically; and the device can further comprise a second transverse track disposed at the rear of said frame body, including at least two parallel rails, and the second transverse track is parallel with the first transverse track at the same height with the same width of the rails thereof.

With aforesaid structures, the frame body of the hanger frames transportation device with gearing has at least one side having erect passages next to the first and second transverse tracks for the hanger frame to pass through, and the side with erect passages can connect with a corresponding side of another frame body, so as to form a continual transportation device by a plurality of connected frame bodies.

What's more, the device further comprises a moving device disposed at the connecting position of two frame bodies, above the first and second transverse tracks. It includes a linear pushing cylinder that has a movable driving member arranged underneath corresponding to the pushing block on the sliding plate, so that the pushing block can be moved by a tappet engaging the driving member so as to transport the hanger frame when it is passing through the area without the rolling chain. The device also includes a rail switch disposed on a supporting plate at the right-hand side of the frame body, connecting with the first and second transverse tracks, a longitudinal rail disposed on the supporting element of the right-hand side of the frame body, and an action cylinder disposed underneath the longitudinal rail to move the supporting plate along the longitudinal rail.

As structures disclosed above, the frame body of the present invention is moved by the sliding plate stably sliding along the rails. A fixed block and a plurality of sticks from the gearing can stably move, fix, and detach the hanger frame which slides along the first transverse track in lines and can be transported to the parallel second transverse track by the longitudinal rail switch in order to lengthen the transportation route. Furthermore, a plurality of parallel first and second transverse tracks are connected by moving devices in order to extend the transporting distance, therefore enabling a wet manufacturing process at the micrometer level during the continual transportation.

BRIEF DESCRIPTION OF THE DRAWINGS

FIG. 8 is a sectional view along line 8-8 in FIG. 6;
FIG. 8A is a partial enlargement view of 8A in FIG. 8.

DETAILED DESCRIPTION OF THE PREFERRED EMBODIMENT

Figure 1:
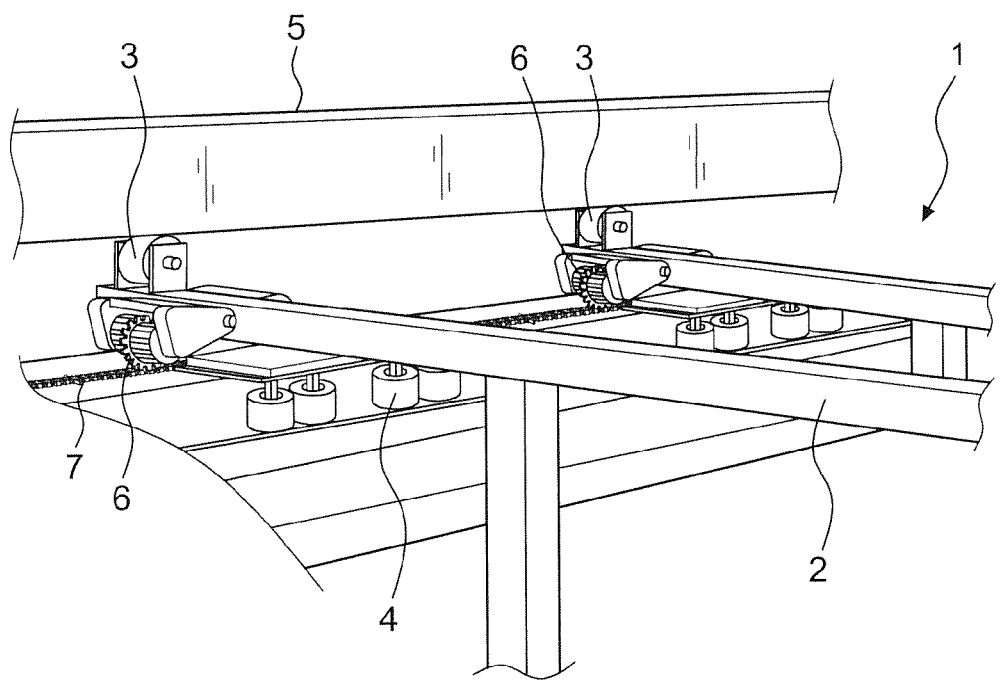
FIG. 1 is a schematic diagram of a conventional hanger frames transportation structure.
Figure 2:
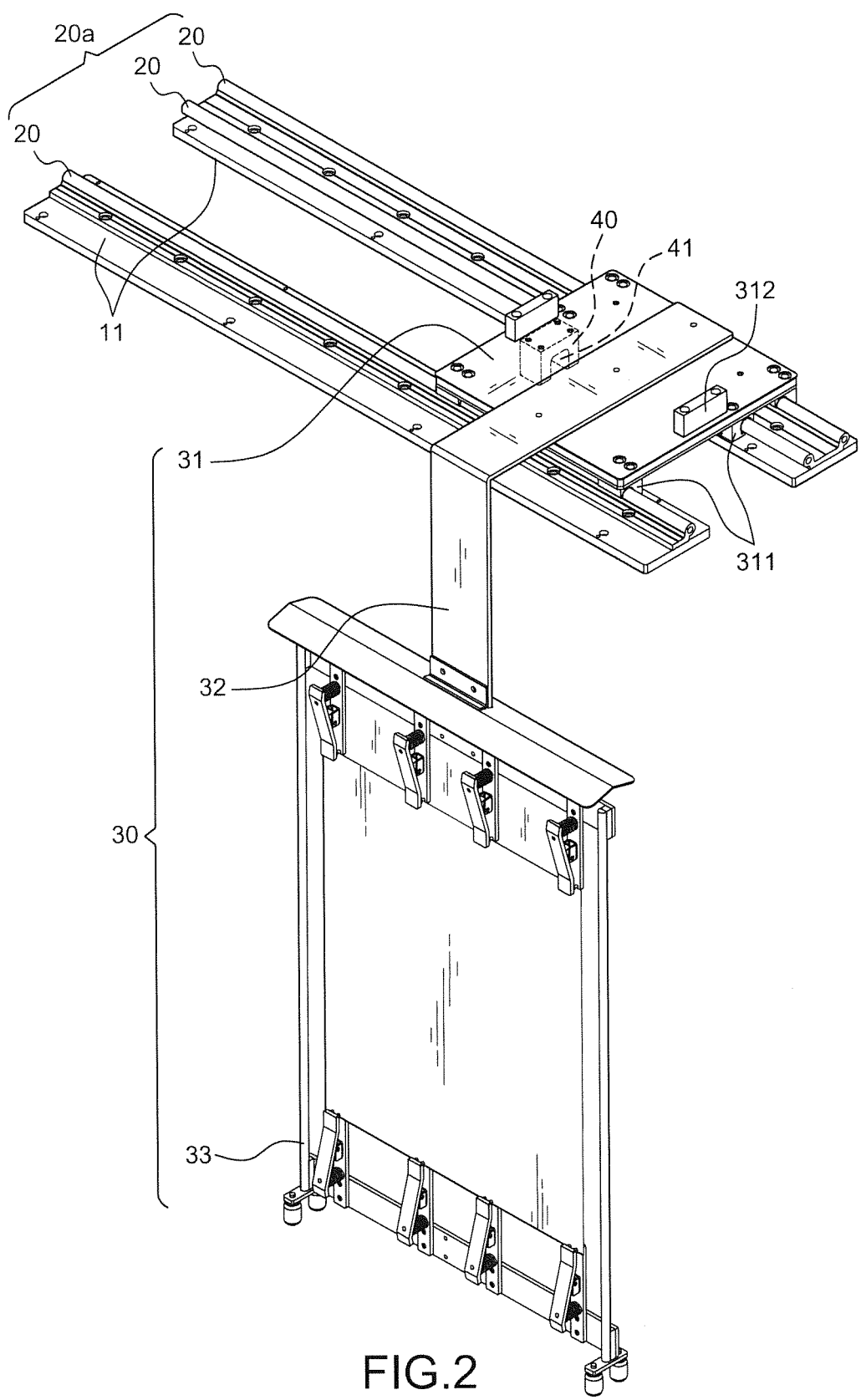
FIG. 2 is a perspective view illustrating the hanger frame of the present invention.
Figure 3:
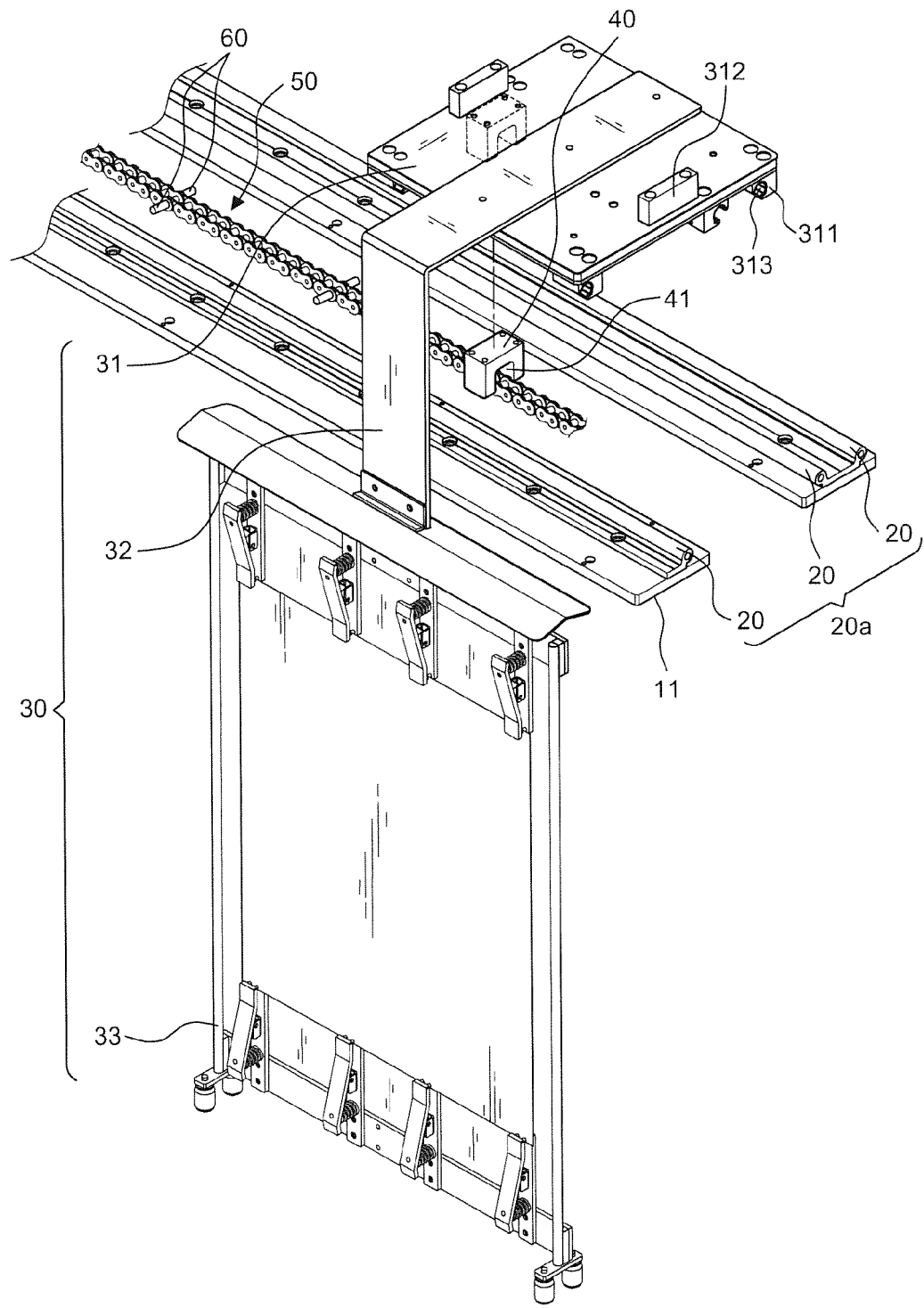
FIG. 3 is an exploded view illustrating the hanger frame of the present invention.

Referring to FIGS. 2-13, in an applicable embodiment, the present invention comprises a frame body 10, a first transverse track 20a, a hanger frame 30, and a fixed block 40.

The frame body 10 includes a plurality of supporting elements 11; the first transverse track 20a is disposed at the front of said frame body 10, including at least two parallel rails 20; the hanger frame 30 includes a sliding plate 31 that slides along said first transverse track 20a, a hanger bracket 32 engaging said sliding plate 31 at top, and a hanging panel 33 engaging the foot of said hanger bracket 32; and the fixed block 40 is disposed at the bottom of said sliding plate 31 and has a fillister 41 at the bottom thereof. In this embodiment, the sliding plate 31 is rectangular and the bottom thereof has at least four sliding seats 311 in order to slide on the rails 20; the rails 20 are in arc shape and the sliding seats 311 are designed in accordance with the arc-shaped rails 20, and there is a layer of poly composites 313 on the contact surface of the sliding seats 311. The layer has properties of being strong, heat-resistant, and anti-erodibility, so that the sliding seats 311 can slide on the rails 20 stably and smoothly without malfunctions, therefore improving the efficiency of the wet manufacturing process during the continual transportation. Furthermore, in a preferred embodiment, the sliding plate 31 of the hanger frame 30 further has at least one pushing block 312 thereon.

With reference to FIGS. 4-7, the present invention further comprises a second transverse track 20b disposed at the rear of said frame body 10, including at least two parallel rails 20, and the second transverse track 20b is parallel with the first transverse track 20a at the same height with the same width of the rails 20 thereof. Additionally, the frame body 10 has at least one side having erect passages 12, 13 next to the first and second transverse tracks 20a, 20b for the hanger frame 30 to pass through, and the erect passages 12, 13 are at the same height as the hanger bracket 32.

Figure 9:
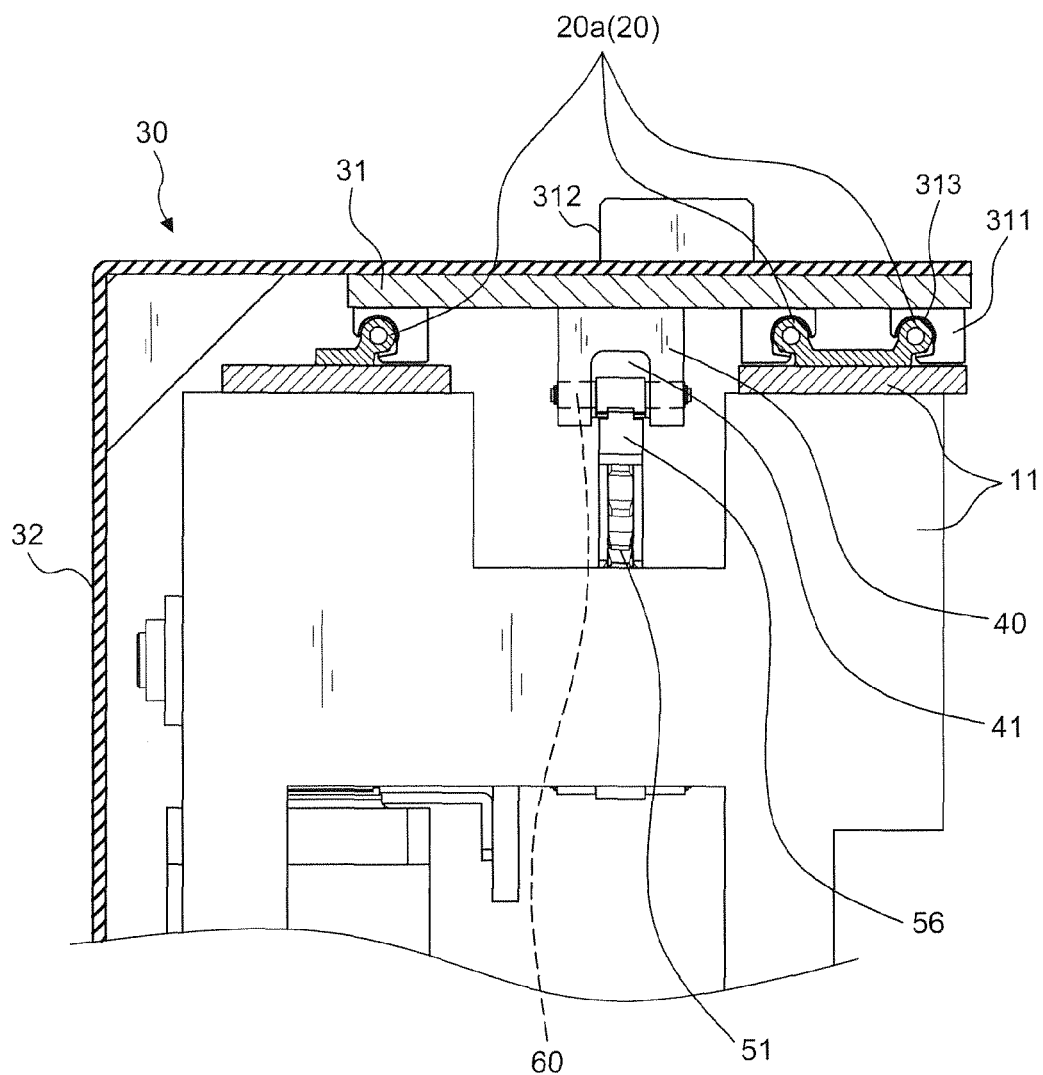
FIG. 9 is an enlarge sectional view along line 9-9 in FIG. 6.

As shown in FIGS. 8, 8A, and 9, there is a gearing 50 disposed on said frame body 10, underneath said first transverse track 20a, including a first chain wheel 51 and a second chain wheel 52 symmetrically disposed on the left-hand and right-hand side of said frame body 10 respectively, a third chain wheel 53 disposed on the front lower left side of the first chain wheel 51, a fourth chain wheel 54 disposed on the back lower right side of the second chain wheel 52, a motor 55 for driving either the third chain wheel 53 or the fourth chain wheel 54, and a chain 56 rolling on the first, second, third and fourth chain wheels 51, 52, 53, 54 with a plurality of sticks 60 arranged on both sides so that when the chain 56 runs through the area between the first and second chain wheel 51, 52, it passes through the fillister 41 of said fixed block 40 and the sticks 60 on both sides would push the fixed block 40 to move the sliding plate 31. In this embodiment, the sticks 60 are arranged symmetrically on both sides of the chain 56.

Figure 10:
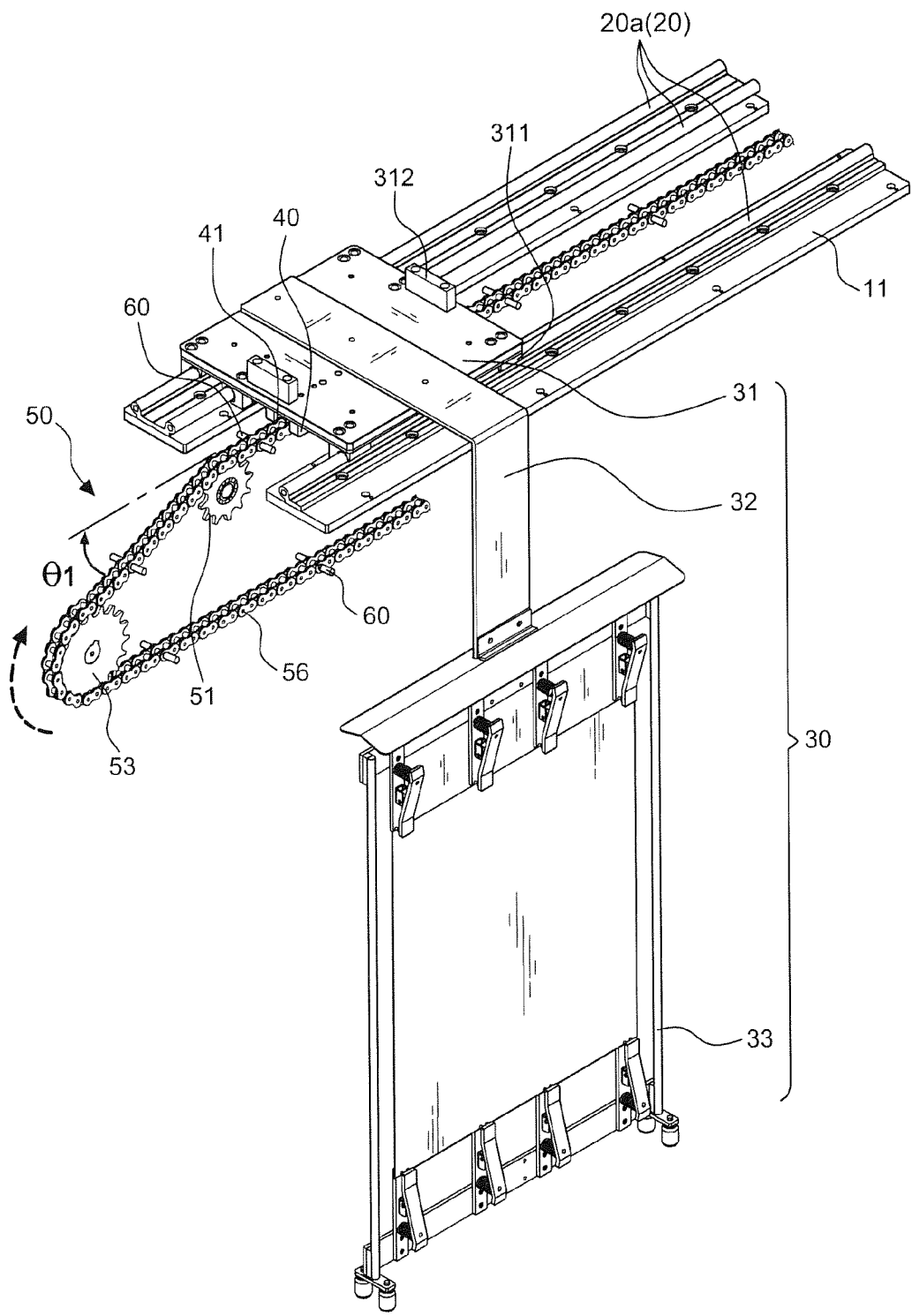
FIG. 10 is a schematic diagram illustrating the left part of the gearing of the present invention.
Figure 11:
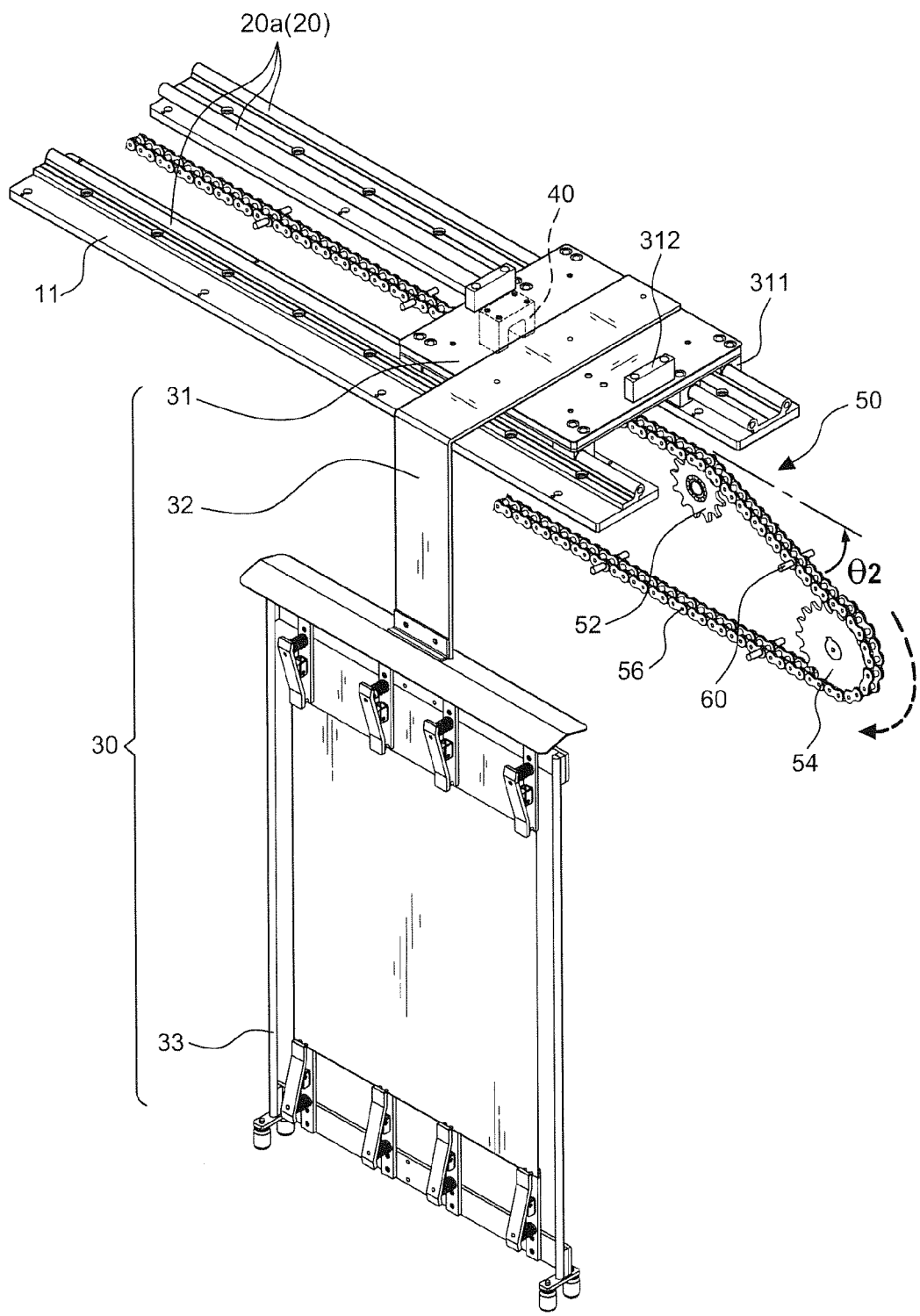
FIG. 11 is a schematic diagram illustrating the right part of the gearing of the present invention.

FIGS. 10 and 11 are schematic diagrams of the left and right part of the present invention respectively, illustrating the way sticks 60 moving the hanger frame 30. In this embodiment, the chain 56 is oblique and running upwards between the third and first chain wheels 53, 51, then it becomes horizontal after passing the first chain wheel 51, pushing the fixed block 40 to move the sliding plate 31 along the first transverse track 20a; and when the chain 56 is rolling between the second and fourth chain wheels 52, 54, it moves downwards, resulting the sticks 60 leaving the fixed block 40, so as to form a continual transportation device 90 to move the hanger frame 30 on the first transverse track 20a. Therefore, the fixed block 40 and the sticks 60 from a gearing 50 can stably move, fix, and detach the hanger frame 30.

Figure 4:
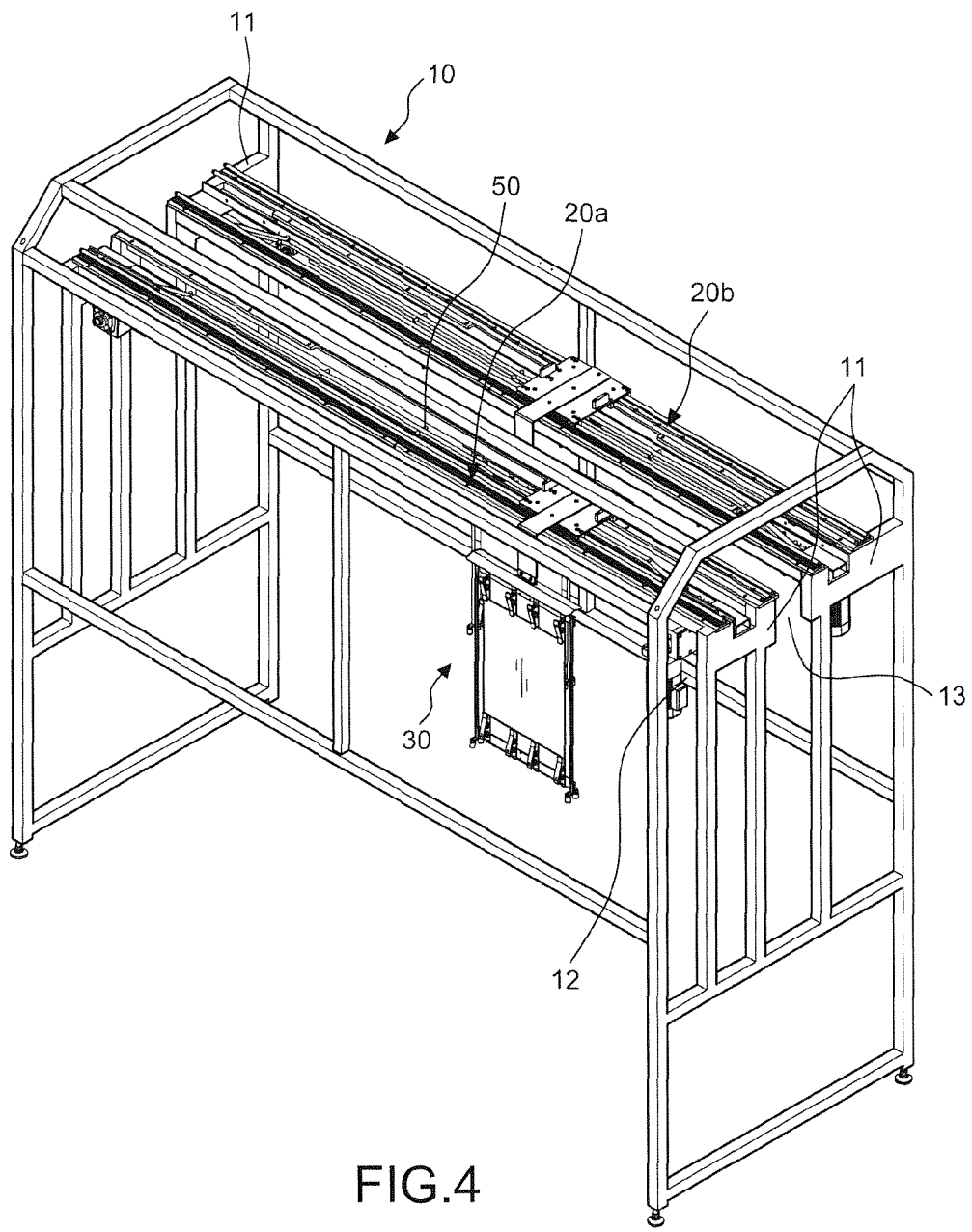
FIG. 4 is a perspective view illustrating a preferred embodiment of the present invention.
Figure 5:
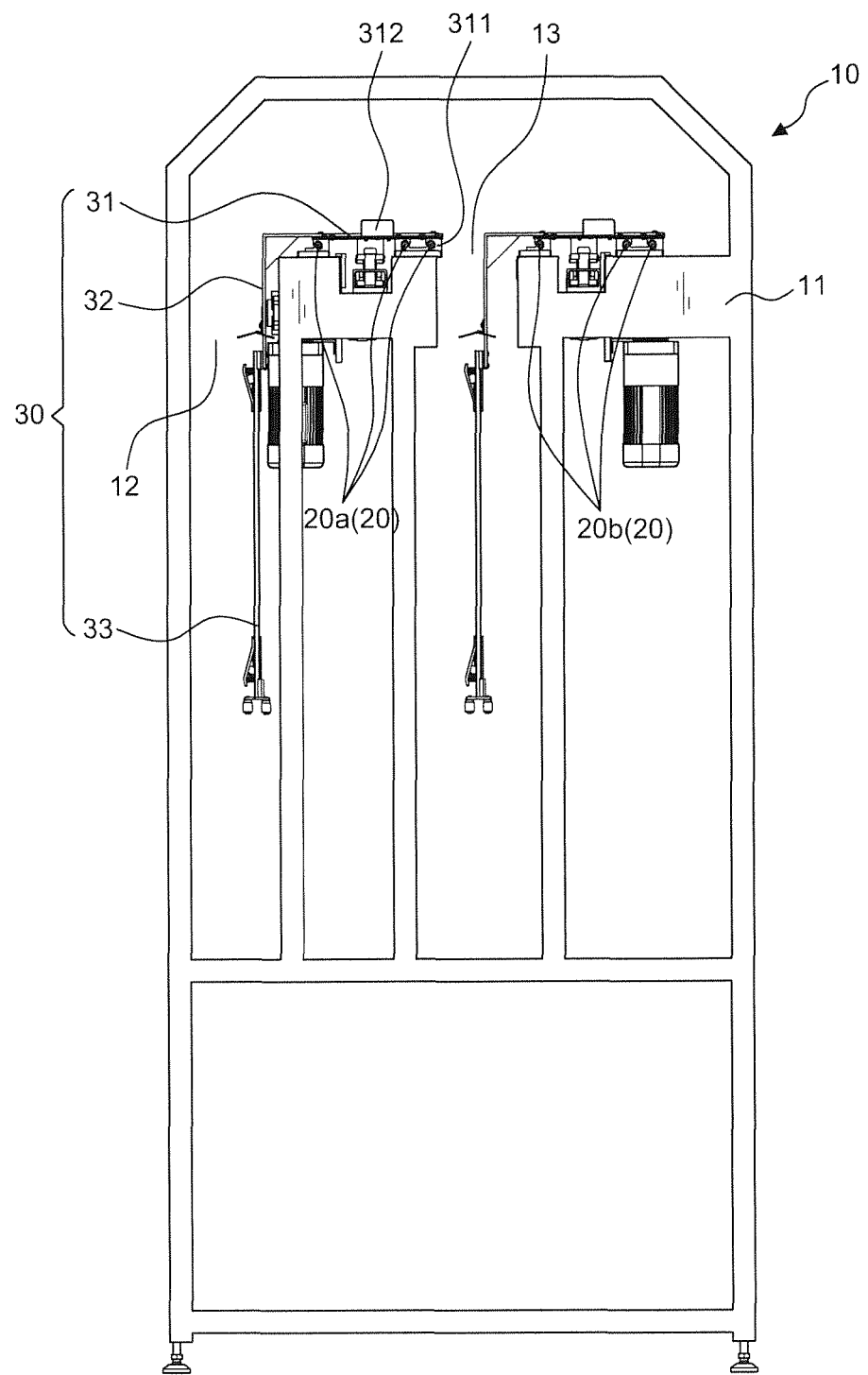
FIG. 5 is a side elevation view of FIG. 4.
Figure 6:
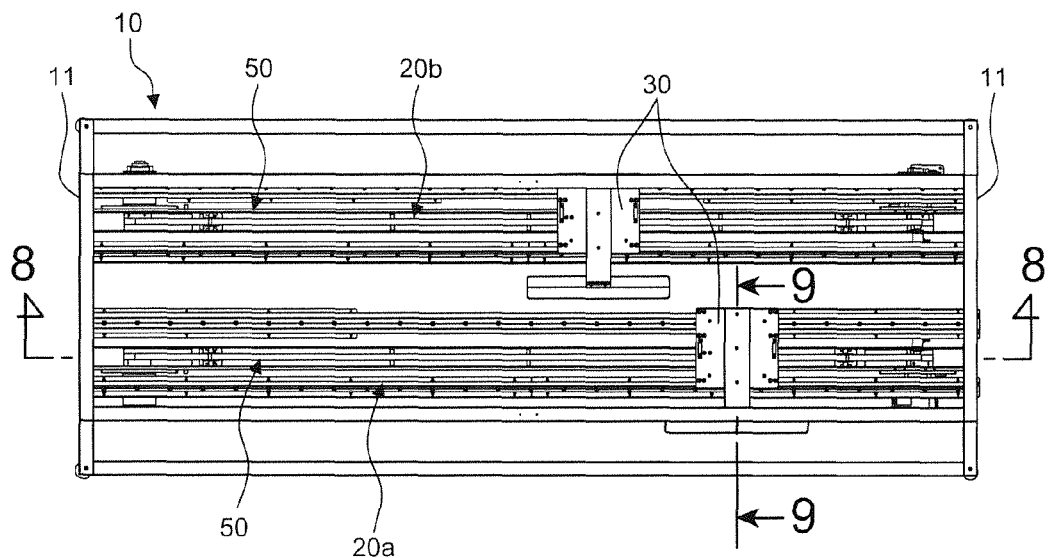
FIG. 6 is a top plan view of FIG. 4.
Figure 7:
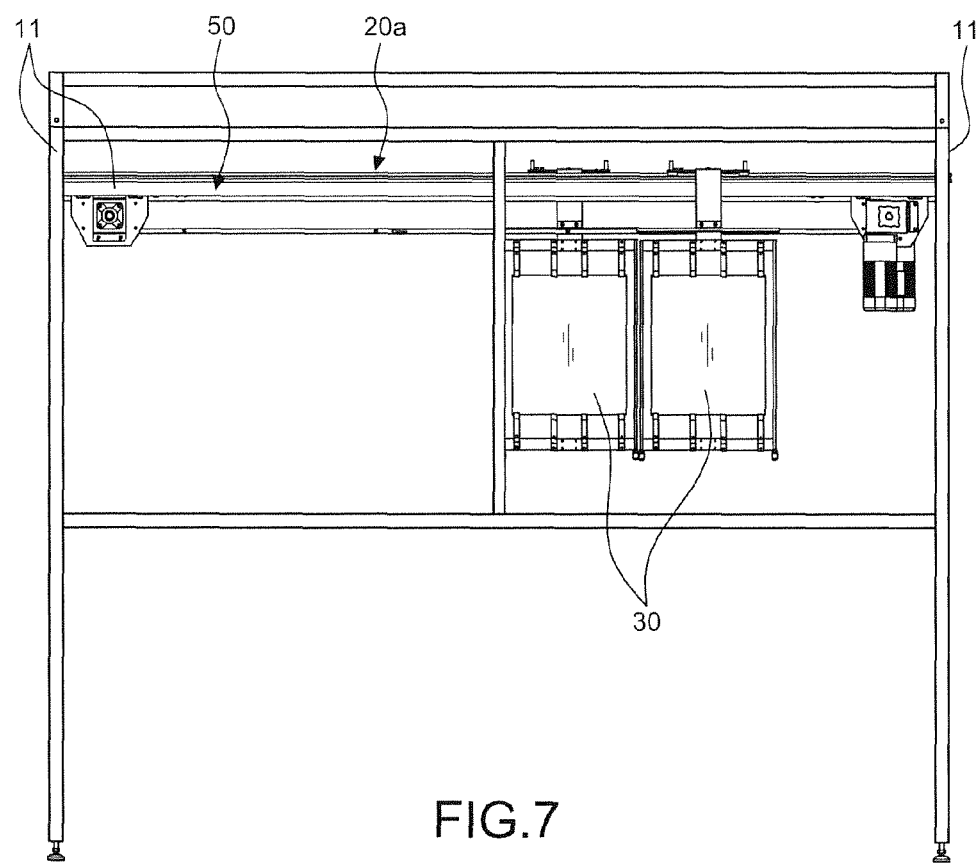
FIG. 7 is a front elevation view of FIG. 4.
Figure 12:
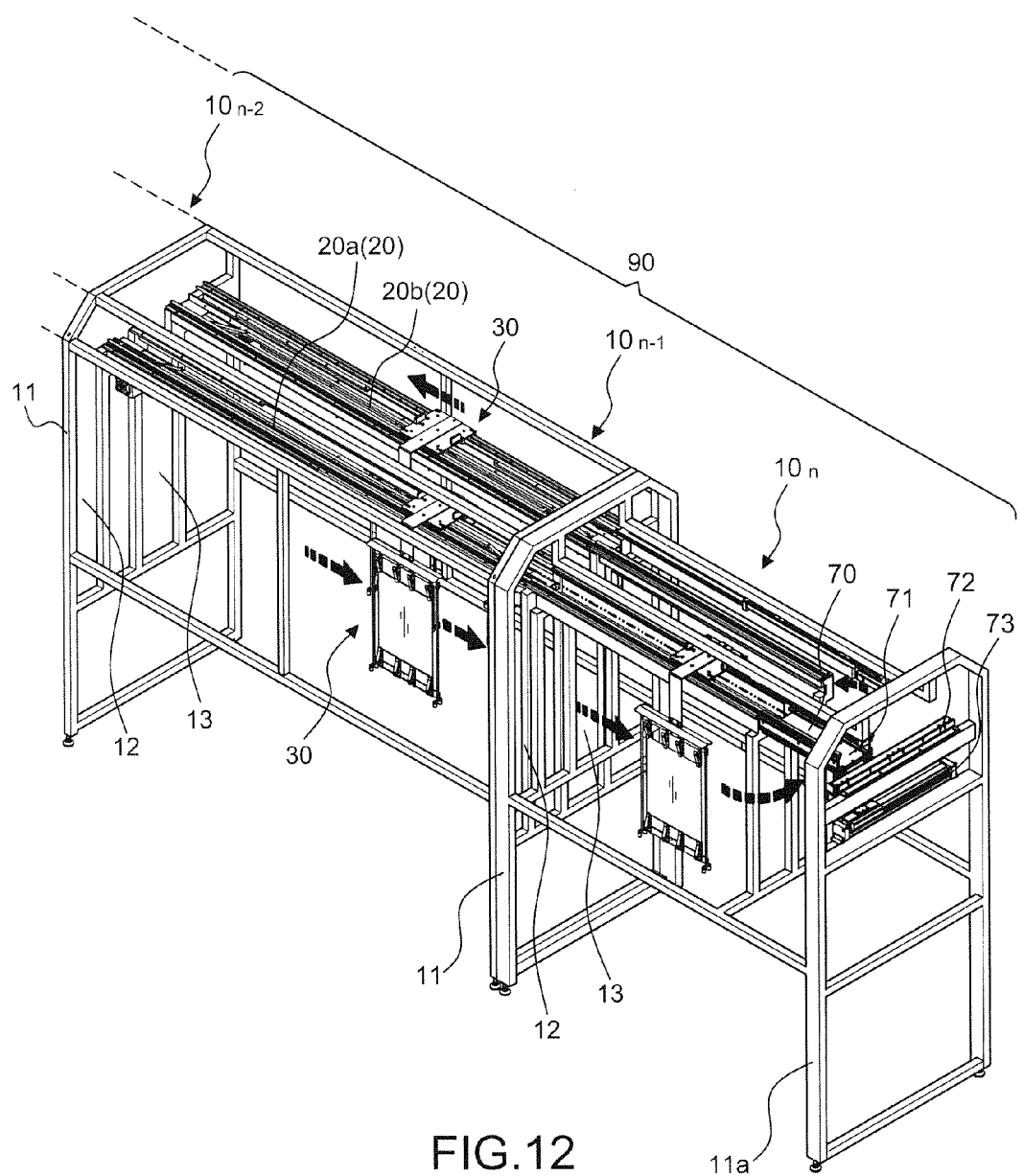
FIG. 12 is a practical application view of the present invention.

Since the frame body 10 has at least one side having erect passages 12, 13 next to the first and second transverse tracks 20a, 20b for the hanger frame 30 to pass through, as shown in FIG. 4, the present invention can form a continual transportation device 90 by connecting a plurality of frame bodies $10_1 \ldots 10_{n-2}, 10_{n-1}$, and $10_n$, as shown in FIG. 12. In this way, the steps of wet manufacturing process can be operated on the connected frame bodies $10_1 \ldots, 10_{n-2}, 10_{n-1}$, and $10n$ without wasting the time and manpower for transporting the hanger frame 30 between the operating locations for each step.

In addition, the continual transportation device 90 has the frame body $10n$ connecting with a corresponding side of another frame body $10_{n-1}$ with the side with erect passages 12, 13, and it further includes a rail switch 70 broadside, disposed on a supporting plate 71 at the right-hand side of the frame body $10n$, connecting with the first and second transverse tracks 20a, 20b. A longitudinal rail 72 is disposed on the supporting element 11a of the right-hand side of the frame body $10n$, and an action cylinder 73 is disposed underneath the longitudinal rail 72 to move the supporting plate 71 along.

Figure 13:
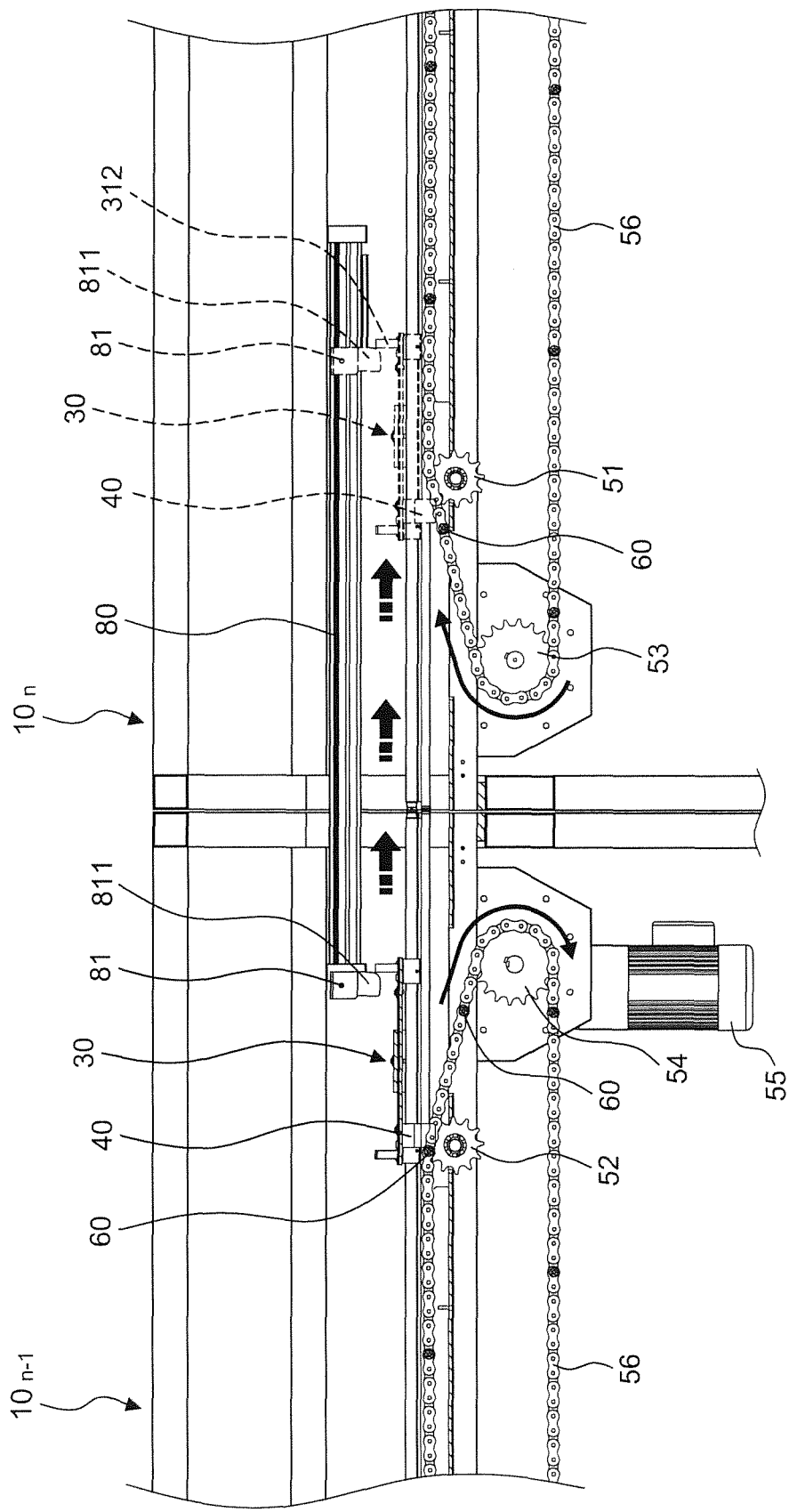
FIG. 13 is a partial enlargement view of FIG. 12.

FIG. 13 is a partial enlargement view of FIG. 12, illustrating the present invention further comprising a moving device 80 disposed at the connecting position of two frame bodies, above the first and second transverse tracks 20a, 20b, which comprises a linear pushing cylinder that has a movable driving member 81 arranged underneath corresponding to the pushing block 312 on the sliding plate 31, so that the pushing block 312 can be moved by a tappet 811 engaging the driving member 81 so as to transport the hanger frame 30 when it is passing through the area without the rolling chain 56.

In conclusion, the present invention has features as below. Firstly, the hanger frame 30 can be stably transported during the wet manufacturing process at the micrometer level since it is carried by the sliding plate 31 and smoothly moved along the first and second transverse tracks 20a, 20b, and the fixed block 40 and sticks 60 from the gearing 50 can also stably move, fix, and detach the hanger frame 30. Secondly, the transportation route can be lengthened with the combining structures of the sliding plate 31 and the gearing 50. For instance, arrange the first and second transverse tracks 20a, 20b in parallel, and then transport the hanger frame 30 from the first transverse tracks 20a to the second transverse tracks 20b by the rail switch 70 to continue the transportation process in the opposite direction. Together with the connection between the transverse tracks 20a, 20b of each frame body 10, the transportation distance is therefore extended for easier arrangements in the continual wet manufacturing process.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A hanger frames transportation device with gearing comprising:
    a frame body including a plurality of supporting elements;
    a first transverse track disposed at the front of said frame body, including at least two parallel rails;
    a hanger frame including a sliding plate that slides along said first transverse track, a hanger bracket engaging said sliding plate at top, and a hanging panel engaging the foot of said hanger bracket;
    a fixed block disposed at the bottom of said sliding plate and having a fillister at the bottom thereof;
    a gearing disposed on said frame body, underneath said first transverse track, including a first chain wheel and a second chain wheel symmetrically disposed on the left-hand and right-hand side of said frame body respectively, a third chain wheel disposed on the front lower left side of the first chain wheel, a fourth chain wheel disposed on the back lower right side of the second chain wheel, a motor for driving either the third or the fourth chain wheel, and a chain rolling on the first, second, third and fourth chain wheels with a plurality of sticks arranged on both sides so that when the chain runs through the area between the first and second chain wheel, it passes through the fillister of said fixed block and the sticks on both sides would push the fixed block to move the sliding plate;
    whereby the chain is oblique and running upwards between the third and first chain wheels, then it becomes horizontal after passing the first chain wheel, pushing the fixed block to move the sliding plate along the first transverse track; and when the chain is rolling between the second and fourth chain wheels, it moves downwards, resulting the sticks leaving the fixed block, so as to form a continual transportation device to move the hanger frame on the first transverse track.

2. The hanger frames transportation device with gearing as claimed in claim 1, wherein the sliding plate is rectangular and the bottom thereof has at least four sliding seats in order to slide on the rails.

3. The hanger frames transportation device with gearing as claimed in claim 2, wherein the rails are in arc shape and the sliding seats are designed in accordance with the arc-shaped rails; and there is a layer of poly composites on the contact surface of the sliding seats.

4. The hanger frames transportation device with gearing as claimed in claim 1, wherein the sticks are arranged symmetrically on both sides of the chain.

5. The hanger frames transportation device with gearing as claimed in claim 1, wherein the sliding plate of the hanger frame further has at least one pushing block thereon.

6. The hanger frames transportation device with gearing as claimed in claim 5, wherein the device further comprises a second transverse track disposed at the rear of said frame body, including at least two parallel rails, and the second transverse track is arranged parallel with the first transverse track at the same height with the same width of the rails thereof.

7. The hanger frames transportation device with gearing as claimed in claim 6, wherein the frame body has at least one side having erect passages next to the first and second transverse tracks for the hanger frame to pass through.

8. The hanger frames transportation device with gearing as claimed in claim 7, wherein the side with erect passages can connect with a corresponding side of another frame body, so as to form a continual transportation device by a plurality of connected frame bodies.

9. The hanger frames transportation device with gearing as claimed in claim 8, wherein the device further comprises a moving device disposed at the connecting position of two frame bodies, above the first and second transverse tracks, which comprises a linear pushing cylinder that has a movable driving member arranged underneath corresponding to the pushing block on the sliding plate, so that the pushing block can be moved by a tappet engaging the driving member so as to transport the hanger frame when it is passing through the area without the rolling chain.

10. The hanger frames transportation device with gearing as claimed in claim 9, wherein the device further includes a rail switch disposed on a supporting plate at the right-hand side of the frame body, connecting with the first and second transverse tracks, a longitudinal rail disposed on the supporting element of the right-hand side of the frame body, and an action cylinder disposed underneath the longitudinal rail to move the supporting plate along the longitudinal rail.

* * * * *